Sept. 18, 1962 R. C. BAKER 3,054,450
RETRIEVABLE PACKER APPARATUS
Filed June 2, 1958 5 Sheets-Sheet 1

INVENTOR.
Reuben C. Baker, Deceased
By - Reuben Carlton Baker, Jr.
Thelma Baker Anderson
Aaron A. Baker
David K. Anderson, Executors Sept. 18, 1962     R. C. BAKER     3,054,450
RETRIEVABLE PACKER APPARATUS Filed June 2, 1958     5 Sheets-Sheet 3

INVENTOR
Reuben C. Baker, Deceased
By — Reuben Carlton Baker, Jr.
Thelma Baker Anderson
Aaron A. Baker
David K. Anderson, Executors Sept. 18, 1962 R. C. BAKER 3,054,450
RETRIEVABLE PACKER APPARATUS
Filed June 2, 1958 5 Sheets-Sheet 4

INVENTOR.
Reuben C. Baker, Deceased
By— Reuben Carlton Baker, Jr.
Thelma Baker Anderson
Aaron A. Baker
David K. Anderson, Executors United States Patent Office 3,054,450
Patented Sept. 18, 1962

3,054,450
RETRIEVABLE PACKER APPARATUS
Reuben C. Baker, deceased, late of Coalinga, Calif., by Reuben Carlton Baker, Jr., Whittier, Thelma Baker Anderson, Downey, Aaron A. Baker, Coalinga, and David K. Anderson, Ventura, Calif., and Security-First National Bank of Los Angeles, executors, assignors to Baker Oil Tools, Inc., Los Angeles, Calif., a corporation of California
Filed June 2, 1958, Ser. No. 739,177
17 Claims. (Cl. 166—120)

The present invention relates to subsurface well apparatus, and more particularly to packers or anchors adapted to be set in well casings, or similar conduit strings, disposed in well bores.

An object of the invention is to provide a well packer or anchor capable of being anchored in a well casing against longitudinal movement in both directions, and of being released and retrieved from the casing whenever desired.

Another object of the invention is to provide a well packer or anchor adapted to be anchored in a well casing against both up and down movement, and of being released from the casing, inadvertent resetting of the tool after its release being prevented.

A further object of the invention is to provide a well packer capable of being anchored in packed-off condition in a well casing against both up and down movement, the packer being capable of manufacture in a relatively short length, being compact, and relatively economical to produce.

An additional object of the invention is to provide a well packer or anchor adapted to be secured in a well casing against both up and down movement and of being retrieved from the well casing through use of a retrieving tool, the retrieving tool being releasable from the packer or anchor in the event the latter cannot be freed from the well casing.

Yet another object of the invention is to provide a well packer or anchor adapted to be secured in a well casing against both up and down movement and which can be fully set hydraulically, avoiding any necessity for taking any up or down strains on the tubular string to which the packer or anchor is connected.

This invention possesses many other advantages, and has other objects which may be made more clearly apparent from a consideration of several forms in which it may be embodied. Such forms are shown in the drawings accompanying and forming part of the present specification. These forms will now be described in detail, for the purpose of illustrating the general principles of the invention; but it is to be understood that such detailed description is not to be taken in a limiting sense, since the scope of the invention is best defined by the appended claims.

Referring to the drawings:

FIG. 2 is an enlarged fragmentary longitudinal section through a portion of the packer disclosed in FIGS. 1 and 1a;

FIG. 11 is a cross-section taken along the line 11—11 on FIG. 10a;

The well packer apparatus A illustrated in the drawings is adapted to be lowered in a well casing B on a suitable running-in string C, to be anchored in packed-off condition in the well casing against movement in both an upward and a downward direction therewithin through use of a suitable setting tool D connected to the running-in string. As specifically shown, the well packer is set in the well casing by lowering it therewithin on a tubular string C, such as a string of drill pipe or tubing, connected to a hydraulically actuated setting mechanism D releasably attached to the well packer. It is to be understood, however, that other types of running-in strings, such as wire lines, and other types of setting tools, such as those deriving their energy from combustion of a power charge, can be used for effecting setting of the well packer in the well casing.

The well packer A includes a tubular body 10 having an upper threaded box portion 11 and a lower member 12 threadedly secured thereto, which, in effect, forms a continuation of the body of the tool. This lower portion 12 may have a valve seat 13 surrounding its passage 14 adapted to be engaged by a flapper valve head 15 suitably pivotally mounted on the lower portion and adapted to swing downwardly away from the valve seat, or upwardly into engagement with the valve seat to prevent upward flow of fluid through the passage 14 in the packer body when the running-in string C has been removed therefrom.

Figures 4, 4A, 5, 6:
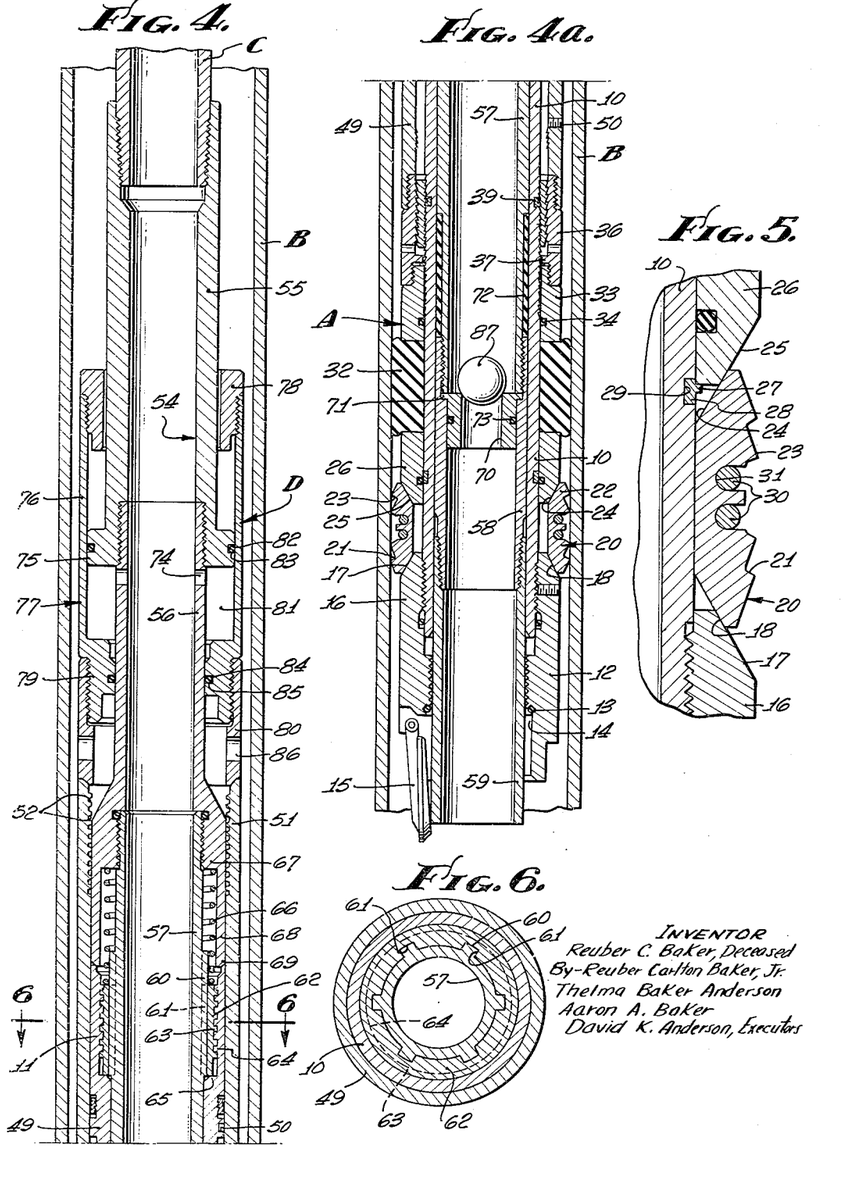
FIGS. 4 and 4a are views corresponding to FIGS. 1 and 1a, respectively, illustrating the packer anchored in packed-off condition in the well casing, FIG. 4a constituting a lower continuation of FIG. 4.
FIG. 5 is an enlarged fragmentary longitudinal section through another portion of the well packer apparatus in retracted position.
FIG. 6 is an enlarged cross-section taken along the line 6—6 on FIG. 4.
Figure 7:
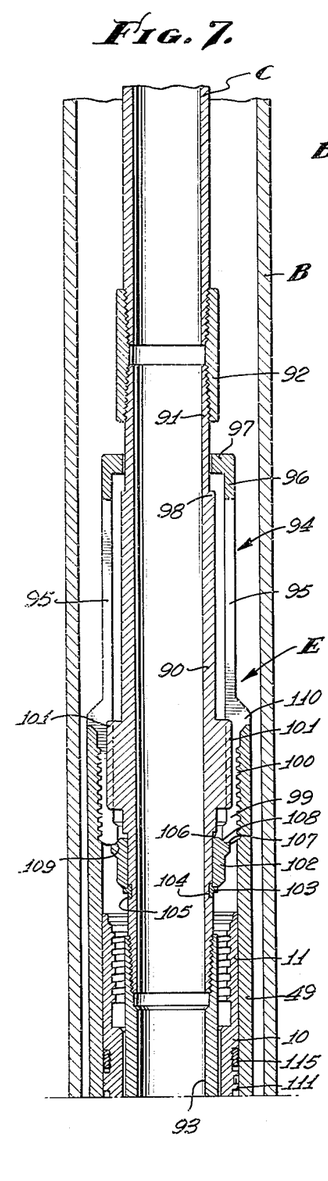
FIGS. 7 and 7a are longitudinal sections illustrating the well packer anchored in packed-off condition in the well casing and with a retrieving tool secured thereto, FIG. 7a constituting a lower continuation of FIG. 7.
Figure 7A:
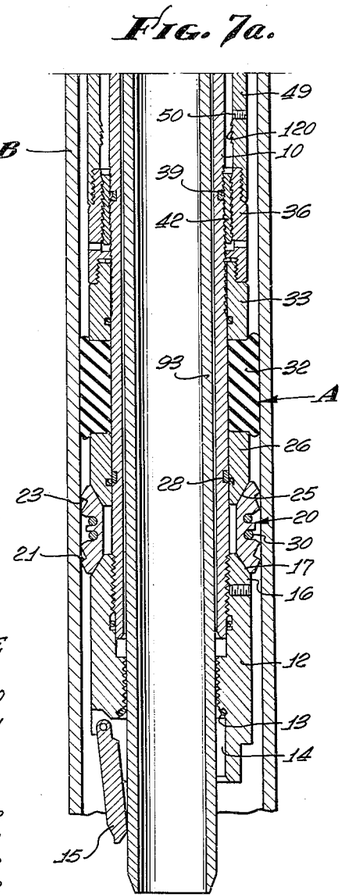

The upper portion of the lower body member 12 is formed as a lower expander 16 having an upwardly and inwardly inclined tapering surface 17 adapted to engage companion tapering inner surfaces 18 on the lower portions 19 of a plurality of segmental slips 20 surrounding the body 10 of the tool. These slips have lower teeth 21 facing in an upward direction for engagement with the wall of the well casing to prevent upward movement of the well packer therewithin. The upper portion 22 of the slips have downwardly facing wickers or teeth 23 adapted to engage the wall of the well casing to prevent downward movement of the well packer therewithin. These upper portions have inner expander surfaces 24 tapering in a downward and inward direction coacting with a companion tapered surface 25 on an upper expander 26 slidable on the body 10 of the tool. This upper expander 26 is initially prevented from moving downwardly of the tool by engaging the outer relatively thin portion 27 of a split shear ring 28 disposed within a peripheral groove 29 in the body of the tool (FIG. 5).

The slips 20 are initially held in a retracted position and are urged toward a retracted position by one or a plurality of split inherently contractile retracting or retrieving springs 30 encompasssing the segmental slip members and received within one or more circumferential grooves 31 in the latter. These spring members 30 may exert a substantial contracting force so as to insure the initial retention of the slips 20 in their retracted position and a return of such slips to such retracted position after they have been expanded into anchoring engagement with the wall of the well casing B.

The upper end of the upper expander 26 engages, or is suitably coupled to, the lower portion of a packing structure 32, which, for example, may be in the form of a rubber or rubber-like packing sleeve surrounding the body of the tool. The upper end of the packing structure engages or may be suitably secured to the lower end of an upper abutment 33 slidable along the body of the tool. To insure against leakage through the inner portion of the packing sleeve 32 after it has been expanded outwardly against the well casing, suitable side seals 34 may be mounted in the upper expander 26 and the upper abutment 33 for sealing engagement against the periphery of the packer body 10. As shown, these side seals may be in the form of rubber or rubber-like O rings 34 mounted in internal grooves 35 in the upper expander 26 and upper abutment 33.

The upper abutment 33 is threadedly secured to the lower portion of a ratchet or lock housing 36 having an inwardly directed flange 37 for clamping the relatively thin outer portion 38 of an upper shear ring 39 to the upper abutment 33. This shear ring 39 is split and is received within a suitable peripheral groove 40 in the body 10 of the tool. Until the outer portion 38 of the shear ring 39 is disrupted, it will prevent downward movement of the upper abutment 33 and of the housing 36 with respect to the body 10. The portion of the ratchet or lock housing 36 above its flange 37 is spaced from the periphery of the body to form an annular recess 41 in which a split ratchet ring or sleeve 42 is contained, which inherently tends to contract. This sleeve has upwardly facing internal ratchet teeth 43 adapted to engage companion downwardly facing ratchet teeth 44 formed on the periphery of the body, in order to hold the well packer A anchored in packed-off condition against the well casing, as described hereinbelow. It also has external cam teeth 45 provided with can surfaces 46 tapering in a downward and inward direction and adapted to engage companion cam surfaces 47 on cam teeth 48 formed in the ratchet housing 36. Relative downward movement of the ratchet sleeve 42 with respect to the housing 36 will cause the cam surfaces 46, 47 to urge and hold the sleeve 42 inwardly, so that the internal ratchet teeth 43 remain in engagement with the external ratchet teeth 44. The coengaging ratchet teeth 43, 44 are formed as left-hand threads to enable relative threading action therebetween to occur, for the purpose of effecting retracting of certain parts of the well packer, as described hereinbelow. Similarly, the cam teeth 45, 48 are formed as coengaging left-hand threads to secure retracting of certain packer parts from engagement with the well casing when the well packer is to be retrieved therefrom.

Threadedly secured to the upper end of the ratchet housing 36 is a setting sleeve 49 which extends upwardly along the body to a position thereabove and which is initially releasably secured to the body of the tool by one or more shear screws 50. This setting sleeve 49 has an upper threaded box 51, the threads being of right hand and preferably with tapered upper and lower thread surfaces 52. The setting sleeve 49 is of such length that its threaded box portion 51 will always extend above the upper end 53 of the packer body 10, in order for a connection to be made between a retrieving tool E (FIGS. 7 to 10a, inclusive) and the setting sleeve 49.

As shown in the drawings, the well packer is lowered in the well casing and can be set therewithin by means of the hydraulically actuated setting tool D. This setting tool includes a tubular mandrel 54 made of a plurality of parts. Thus, an upper mandrel portion 55 is threadedly attached to the lower end of the tubular string C and is, in turn, threadedly secured to a first intermediate mandrel portion 56 which is, in turn, threadedly attached to a second intermediate mandrel portion 57 extending through the central passage 14 of the body of the tool. This second intermediate mandrel portion is, in turn, threadedly attached to a lower mandrel portion 58 which may be threadedly secured to a tubing extension or tail pipe 59 extending through the lower end of the packer and engaging the flapper valve head 15 to retain it from its companion valve seat 13. The second intermediate mandrel portion 57 has a plurality of cirfumferentially spaced keys or splines 60 thereon received within companion longitudinal grooves 61 in a setting nut 62 having left-hand threads 63 adapted to mesh with internal left-hand threads 64 in the upper portion 11 of the body 10 of the well packer. This threaded nut 62 is urged in a downward direction along the mandrel 57 into engagement with a shoulder 65 on the latter by a helical compression spring 66 encompasing the second intermediate mandrel portion, with its lower end engaging the nut 62 and its upper end engaging a downwardly facing shoulder 67 on the lower portion of the first intermediate mandrel portion 56. This spring 66 is enclosed partially within a skirt 68 depending from the first intermediate mandrel portion 56, the lower end 69 of the skirt being adapted to engage the upper end 53 of the packer body 10.

The mandrel passage is initially open, to enable fluid to pass in both directions therethrough. This fluid will also pass through a valve seat 70 disposed in the lower mandrel portion 58 and releasably held therewithin by virtue of the clamping of an upper shear ring portion of flange 71 of the valve seat between the lower end of the second intermediate mandrel portion 57 and the lower mandrel portion 58. A suitable side seal 72 is also disposed on the second intermediate mandrel portion 57, being held between the latter and the lower mandrel portion 58 for sealing engagement with the wall of the packer body to prevent leakage of fluid between the mandrel 54 and the packer body 10. Leakage of fluid around the exterior of the valve seat 70 is also prevented by a side seal 73 thereon engaging the wall of the mandrel portion 58.

The valve seat 70 is located below one or a plurality of side ports 74 in the mandrel 54, such as near the upper portion of its first intermediate mandrel portion 56, that are disposed immediately below an annular piston 75 integral with and extending laterally of the upper mandrel portion 55 and slidably engaging the skirt 76 of an annular cylinder 77, the upper end of the skirt being secured to a stop nut or head 78, and the lower end of which is integral with a cylinder head 79 slidable along the first intermediate mandrel portion 56 below the ports 74. This head 79 is threadedly secured to the upper portion of an actuating sleeve 80 engaging the upper end of the packer setting sleeve 49 when the mandrel skirt 68 engages the upper end 53 of the packer body 10.

Fluid can enter the cylinder space 81 between the annular piston 75 and the cylinder head 79 through the ports 74. Such fluid is prevented from leaking from this annular cylinder space by a side seal 82, in the form of a rubber or rubber-like O-ring, mounted in a piston ring groove 83 and slidably and sealingly engaging the wall of the cylinder sleeve 76. Fluid flow in a downward direction is prevented from leaking from the cylinder space by mounting a side seal 84, such as a rubber or rubber-like O-ring, in an internal groove 85 in the cylinder head 79 which slidably and sealingly engages the periphery of the first intermediate mandrel portion 56. To prevent any fluid from being trapped and from impeding proper operation of the apparatus, the actuating sleeve 80 may be provided with one or a plurality of bleeder holes 86 therethrough.

Figure 1:
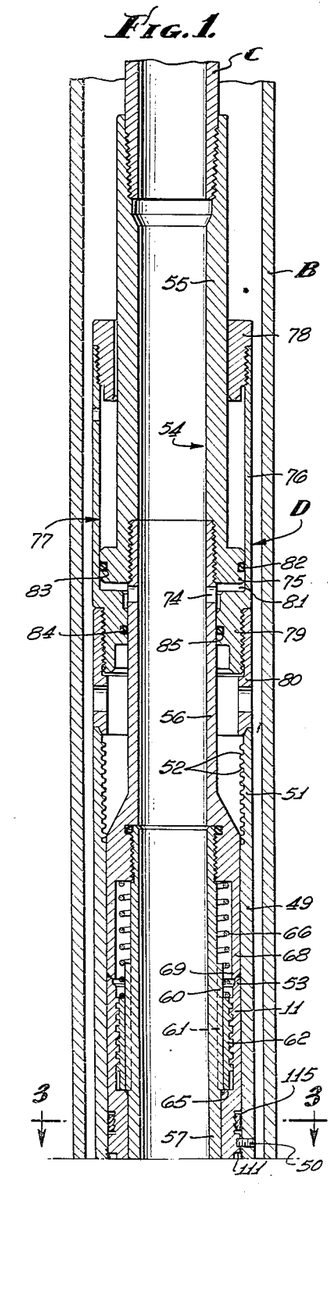
FIGURES 1 and 1a together constitute a longitudinal section through a well packer and setting tool apparatus within a well casing, the packer parts being in their initial retracted position, FIG. 1a constituting a lower continuation of FIG. 1.
Figure 1A:
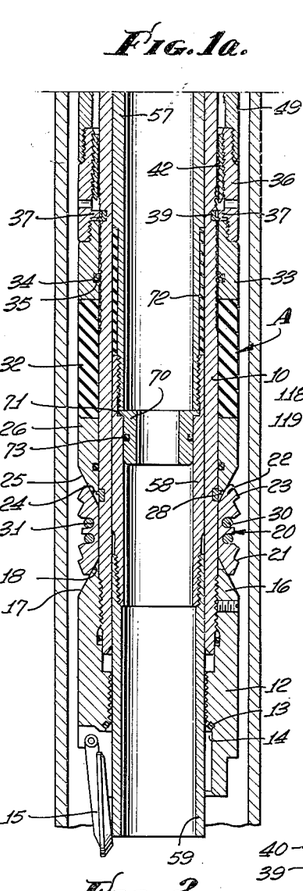

In the use of the apparatus heretofore described, the setting tool D is attached to the well packer A, the parts occupying the position shown in FIGS. 1 and 1a. The setting tool mandrel 54 is secured to the tubular string C and the apparatus is then lowered on the tubular string through the casing B to the desired setting point. When such setting point is reached, a valve element 87, such as a tripping ball, is lowered or pumped down through the tubular string C, coming to rest upon the valve seat 70, closing the passage through the latter and allowing the pressure of the fluid in the tubular string C and mandrel 54 to be increased. Such fluid under pressure passes through the ports 74 and acts in an upward direction on the mandrel 54, tending to urge the mandrel and the body 10 of the well packer connected thereto in an upward direction, and the cylinder head 79, actuating sleeve 80, and setting sleeve 49 in a downward direction. When the fluid pressure reaches a value sufficient to overcome the strength of the shear screws 50 and the shear rings 28, 39, these members are disrupted, which then permits the cylinder 77, actuating sleeve 80, setting sleeve 49, ratchet housing 36, and upper abument 33 to move relatively downward along the body 10, the mandrel 54 and the body 10 of the tool being urged in an upward direction. Such relative movement will shift the lower expander 16 upwardly within the slips 20 and the upper expander 26 downwardly within the slips 20, by moving the expanders toward each other, shifting the slips outwardly until they engage the well casing. When this occurs, the body 10 of the tool cannot move upwardly to any further significant extent, except to that permitted by the digging of the slip wickers 21, 23 into the wall of the well casing, which is also true of downward movement of the upper expander 26 behind the slips. Accordingly, a continuation of the downward movement of the cylinder 77, actuating sleeve 80, setting sleeve 49, ratchet housing 36, and upper abutment 33 along the body will shift the upper abutment 33 toward the expander 26, foreshortening the packing sleeve 32 and effecting its expansion into sealing engagement with the wall of the well casing.

Downward movement of the ratchet housing 36 with respect to the body 10 is permitted by virtue of the fact that the ratchet sleeve teeth 43 can ratchet freely over the body teeth 44. As the fluid pressure in the tool is increased, the slips 20 are embedded more firmly into the wall of the well casing, and the packing sleeve 32 is further foreshortened and compressed outwardly into firm sealing engagement with the wall of the well casing B and the periphery of the body 10 of the tool. After the packer has thus been anchored in packed-off condition in the well casing against movement in both longitudinal directions, the pressure, if desired, can be relieved, the ratchet teeth 43 of the ratchet sleeve 42 engaging the companion teeth 44 on the body 10 of the tool and being held in such engaged position by the coengaging cam teeth 45, 48 to prevent relative upward movement of the ratchet housing 36 with respect to the body 10 of the tool. The well packer is thus secured in its anchored and packed-off condition in the well casing.

The passage through the mandrel 54 can now be opened, if desired, by a further increase in the pressure of the fluid in the tubular string C and mandrel, until the shear strength of the shear flange 71 of the valve seat 70 is overcome, this flange then being sheared from the remainder of the valve seat and the latter and the ball valve element 87 pumped down out through the mandrel and the tubing stinger 59. The passage through the tubing string C and the mandrel 54 is now clear. Fluent substances can be pumped therethrough for the performance of desired operations in the well bore, or other equipment, such as perforating guns and the like, can be lowered therethrough for the performance of desired operations below the well packer. If desired, the mandrel can remain secured to the well packer to permit the well production to flow upwardly through the mandrel and the tubular string to the top of the well bore. However, the setting tool D can, if desired, be disconnected from the well packer A and elevated to the top of the well bore. Such disconnection will occur simply as a result of rotating the tubular string and the mandrel to the right, which will effect an unthreading of the setting nut 62 from the box 11 of the packer body 10. Upon such unthreading, the tubular string C and the mandrel 54 can be removed completely from association with the well packer. As the tubing extension 59 moves above the flapper valve head 15, the latter can swing upwardly into engagement with its companion valve seat 13, to prevent upward flow of fluid through the well packer.

Another tubing string (not shown), with suitable seal devices, can be lowered through the well casing and placed in appropriate sealing relation to the inner wall of the well packer, the packer A then functioning as a production device to conduct well production through the packer and a suitable tubing string to the top of the well bore.

If it is desired to release and retrieve the set well packer A from the well casing, the tubular string that may be associated therewith is removed from such association and is withdrawn completely from the well casing. The retrieving tool E is then secured to the tubular string C and is run in the well casing to the location of the well packer. As shown in FIGS. 7 to 11, inclusive, the retrieving tool includes a tubular mandrel 90 having an upper threaded pin 91 for threaded attachment to a coupling 92 that is secured to the lower end of the tubing or drill pipe string C. This mandrel may have a tail pipe 93 threadedly attached to its lower portion which is adapted to extend through the body 10 of the well packer and engage the flapper valve head 15 to move it from the valve seat 13 to an open position.

Disposed about the mandrel 90 is a retrieving or latch sleeve 94 which is slotted to provide leg portions 95 that depend from a circumferential continuous upper portion 96 of the sleeve, which has an inwardly directed flange 97 adapted to engage the lower end of the coupling 92 and also to be engaged by an upwardly facing shoulder 98 on the mandrel 90. The leg portions 95 extend downwardly along the mandrel 90, terminating in threaded foot portions 99 having threads 100 companion to the internal threads 51 at the upper end of the well packer setting sleeve 49. The mandrel 90 has drive keys 101 integral therewith, or otherwise suitably secured thereto, extending between and engageable with the sides of the threaded feet 99. A rotational drive is thereby secured between the mandrel 90 and the foot portions 99 of the retrieving sleeve 94, which rotational drive is maintained despite the ability of the retrieving sleeve to move upwardly and downwardly along the mandrel to some extent.

Below the keys 101, the mandrel can carry a retaining ring 102 resting upon the outer portion 103 of a split shear ring 104 fitting within a peripheral groove 105 in the mandrel 90. This retaining ring 102 may move upwardly a slight distance on the mandrel 90 to the extent limited by its engagement with a downwardly facing mandrel shoulder 106 below the drive keys 101. The retaining ring 102 has an upwardly facing shoulder 107 normal to its axis adapted to engage the lower ends of the foot portions 99 of the retrieving sleeve. When so engaged, a tapered holding surface 108 on the retaining ring 102 is disposed behind and in engagement with a companion tapered surface 109 at the lower inner portions of the retrieving sleeve feet 99. The direction of taper is upwardly and inwardly.

The retrieving tool E is lowered on the tubing string C to the location of the well packer A, which is anchored in packed-off condition therewithin. The tail pipe 93 passes into the packer and will displace its valve 15 from engagement with its seat 13. The retaining ring 102 will move within the upper part of the setting sleeve 49, followed by the threaded foot portions 99 of the retrieving sleeve 94, which can shift inwardly as they move within the threaded box 51 of the retrieving sleeve, ratcheting freely over the internal threads of the latter to the extent determined by engagement of flanges 110 on the retrieving sleeve legs 95 with the upper end of the setting sleeve 49. During such downward movement, the retrieving sleeve 94 is forced into the setting sleeve 49 by engagement of the mandrel coupling 92 with the upper end of the sleeve flange 97. When the leg flanges 110 engage the upper end of the setting sleeve 49, further downward motion of the retrieving tool E cannot occur. Accordingly, an upward pull can be taken on the tubular string C, which will move the mandrel 90 upwardly to place the retaining ring 102 against and behind the lower ends of the latch feet or segments 99, to hold such segments in firm threaded engagement with the internal threads 51 of the setting sleeve 49.

Figure 8:
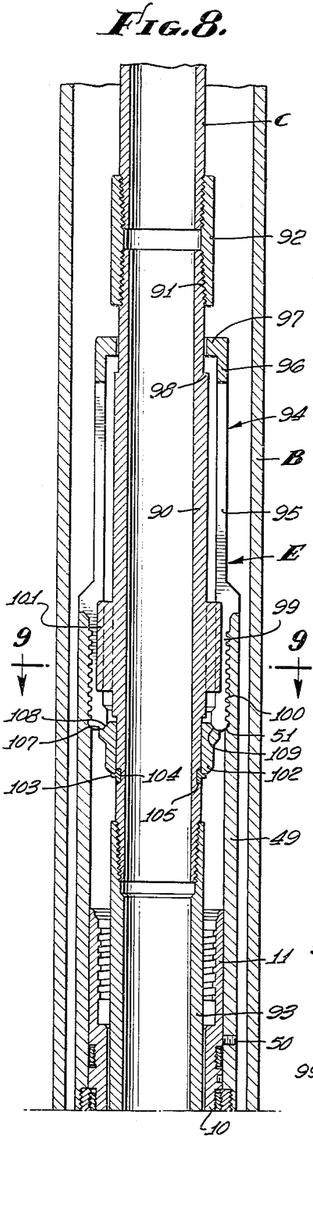
FIGS. 8 and 8a are views similar to FIGS. 7 and 7a, illustrating the well packer with its parts in their retracted position for enabling removal of the apparatus from the well casing, FIG. 8a constituting a lower continuation of FIG. 8.
Figure 8A:
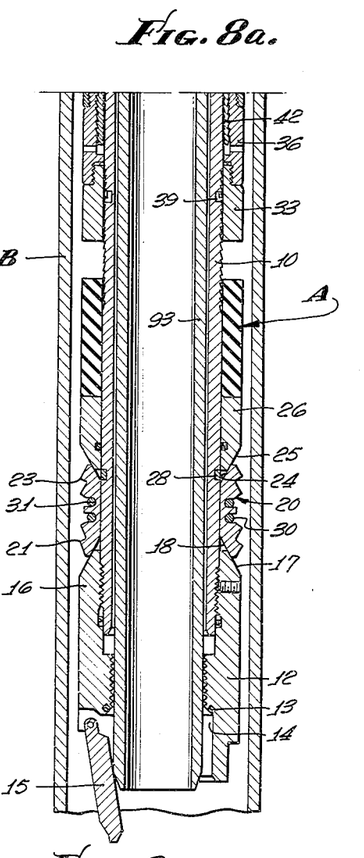
Figure 9:
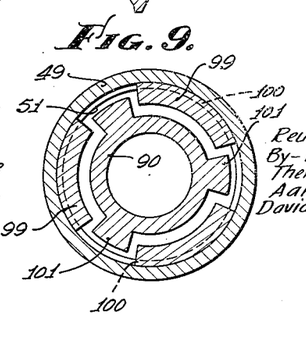
FIG. 9 is an enlarged cross-section taken along the line 9—9 on FIG. 8.

The tubing string C and mandrel 90 are now rotated to the right. Such rotation is transferred from the driving keys 101 to the threaded foot portions 99, and through the threaded foot portions to the threaded sleeve 49 of the tool. The rotation of the setting sleeve 49 of the tool A will effect a relative downward threading of the packer ratchet sleeve 42 along the ratchet housing 36, in view of the left-hand threaded connection between the cam teeth or threads, 45, 48. When the lower end of the ratchet sleeve engages the inwardly directed flange 37 of the ratchet housing 36, the sleeve 42 cannot move downwardly to any further extent and relative rotation between the ratchet housing 36 and ratchet sleeve 42 can no longer take place, these two parts then turning as a unit. Accordingly, their rotation as a unit will cause the internal ratchet teeth threads 43 of the sleeve 42 to rotate on the body ratchet teeth threads 44 and feed upwardly along the body 10, in view of the fact that the interengaging ratchet teeth are constituted as left hand threads. The setting sleeve 42, ratchet housing 36 and upper abutment 33 connected thereto are thus rotated relative to the body 10 of the tool and will feed upwardly along the body of the tool until the threads 43 of the ratchet sleeve move completely out of engagement with the threads 44 of the ratchet body 10, whereupon upward movement of the tubular string C and mandrel 90 will act through the shear ring 104, retaining sleeve 102, and threaded latch feet or segments 99 to lift the setting sleeve 49 upwardly, carrying the ratchet housing 36 and upper abutment 33 upwardly along the body 10 to the extent limited by engagement of the ratchet housing 36 with the upper enlarged head portion 111 of the packer body 10. At this time, the downward compressive force on the packing sleeve 32 will have been removed, which will inherently retract to its initial position, the downward wedging force on the upper expander 26 also having been removed. The retracting springs 30 encompassing the slips 20 will then pull the slips inwardly away from the casing B and back to their retracted position. The well packer is now free from the well casing, and can be withdrawn from the well casing by elevating the tubular string C therewithin, which will act through the retrieving tool E to lift the entire well packer A through the well casing to the top of the hole (FIGS. 8, 8a).

In lieu of the rotation imparted by the retrieving tool E to the setting sleeve 49 effecting an upward threading of the ratchet sleeve 36 along the body 10 of the tool to relieve the holding force on the packing sleeve 32 and the slips 20, such rotation might actually result in a downward movement of the body 10 of the tool to some extent, which will lower the lower expander 16 from the slips 20 and permit the retracting springs 30 to return the slips to their initial retracted position.

At times, it has been found that the rotation of the retrieving tool E, in order to rotate the setting sleeve 49, will feed the ratchet sleeve or ring 42 downwardly of the ratchet housing 36 to relieve the cam action of the coengaging cam threads 45, 48 tending to hold the ratchet teeth 43, 44 coengaged, the teeth disengaging by virtue of expansion of the ratchet sleeve 42. When this occurs, the tendency of the packing sleeve 32 to expand will rapidly shift the upper abutment 33, ratchet housing 36, and setting sleeve 49 in an upward direction, the ratchet sleeve 42, in effect, jumping back up the body 10 to relieve the compressive force on the packing sleeve 32. The full disengagement of the ratchet teeth 43, 44 from each other will permit the setting sleeve 49 to be moved upwardly, to insure that the packing sleeve 32 and the slips 20 have returned to their initial retracted positions by removing the upper abutment 33 away from the packing sleeve 32 to a substantial extent, such as shown in FIGS. 8 and 8a.

Figure 10:
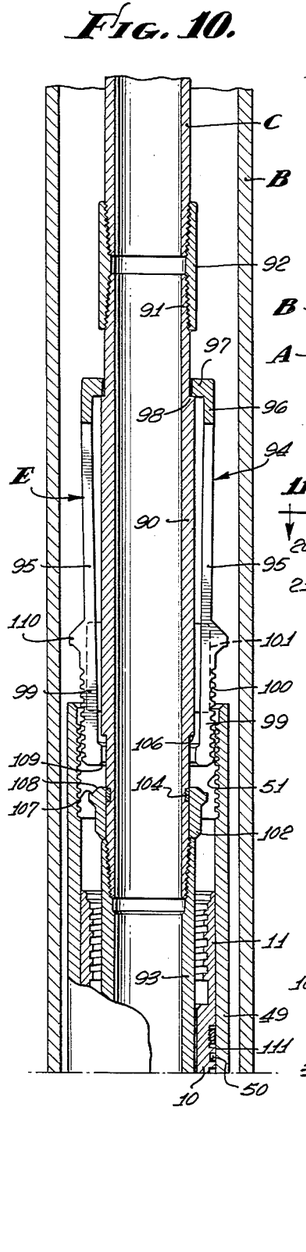
FIGS. 10 and 10a are views similar to FIGS. 7 and 7a, illustrating the retrieving tool being released from the well packer in the event the latter cannot be freed from the well casing, FIG. 10a constituting a lower continuation of FIG. 10.
Figure 10A:
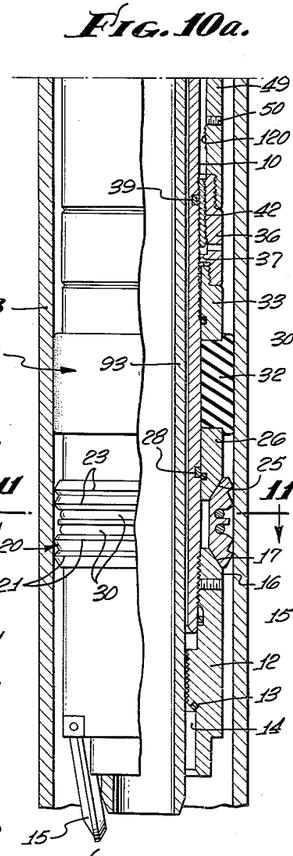
Figure 11:
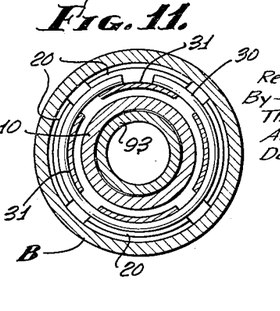

In the event that the well packer A cannot be released after connecting the retrieving tool E thereto, the retrieving tool can nevertheless still be released from the well packer and withdrawn from the hole. All that is required is to take a sufficient upward strain on the tubular string C and the retrieving mandrel 90. Such upward strain is being transmitted through the shear ring 104 to the retaining ring 102, and from the latter through the threaded latch segments or feet 99 to the setting sleeve 49, which forms part of the well packer A that is anchored in the well casing B. When the strength of the shear ring has been exceeded, its outer portion 103 will be sheared or disrupted from its inner portion, allowing the retaining ring 102 to drop down along the mandrel 90 and away from its position behind the threaded latch feet 99. Upward movement of the mandrel 90 will then cause its shoulder 98 to engage the retrieving sleeve flange 97, pulling upwardly on the retrieving sleeve 94. Since the right-hand threads of the retrieving sleeve feet or segments 99 are tapered and engage companion tapered threads 51 on the setting sleeve 49, the threaded latch segments 99 will be cammed inwardly by the coengaging threads 51 and will ratchet freely over the latter until the feet 99 have been completely removed therefrom (FIG. 10). The retrieving tool E can now be elevated completely from the well casing, carrying the tail pipe 93 upwardly with it, the flapper valve 15 of the packer moving upwardly into engagement with its valve seat 13 once again.

Figure 2:
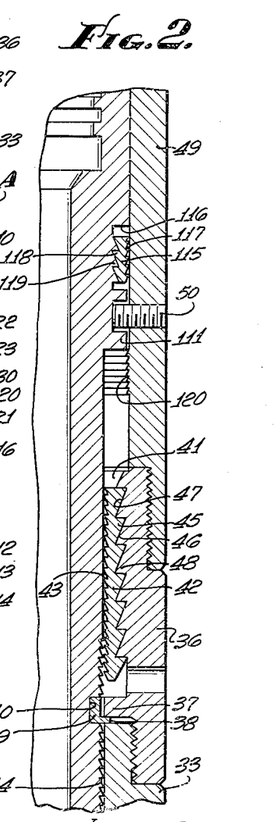
Figure 3:
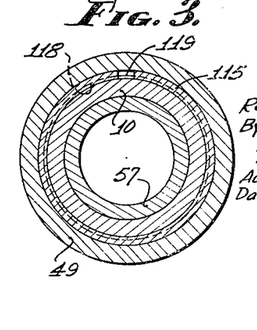
FIG. 3 is an enlarged cross-section taken along the line 3—3 on FIG. 1.

After the well packer A has been released from the well casing B, it is desired to prevent inadvertent resetting of the well packer. Accordingly, an anti-resetting device is incorporated in the well packer. It includes a split retrieving ring 115 mounted in a groove 116 in the upper portion of the body head 11 (see particularly the upper portion of FIG. 2). This split retrieving ring 115 has external upwardly facing ratchet teeth 117 thereon and internal cam teeth 118 adapted to coact with external cam teeth 119 on the body forming the base of the groove 116. Disposed initially below the split retrieving ring 115 are companion internal ratchet teeth 120 on the setting sleeve 49 (clearly shown in FIG. 2). The sleeve ratchet teeth 120 face in a downward direction, and are adapted to be engaged by the upwardly facing ratchet teeth 117 on the retrieving ring. Initially, when the well packer is run in the well bore, the sleeve ratchet teeth 120 are disposed a substantial distance below the ring 115, the ratchet teeth 117, 120 being incapable of engaging one another. During the setting of the well packer in the well casing, the distance between the ratchet teeth 117, 120 increases to a further extent (FIGS. 4, 4a). However, when the setting sleeve 49 is rotated by the retrieving tool E to effect a relative upward threading of the setting sleeve 49, ratchet housing 36 and upper abutment 33 with respect to the body 10, the setting sleeve 49 can move upwardly of the body 10 to a further extent than its initial position on the body and prior to shearing of the various screws 50 and shear rings, 28, 39. The additional upward movement of the setting sleeve 49 along the body 10 will cause the internal ratchet teeth 120 on the setting sleeve to ratchet upwardly along the retrieving ring 115 until the ratchet housing 36 engages the enlarged head 111 on the body, at which time the ratchet teeth 117, 120 are in full engagement, as shown in FIG. 8. Since the ratchet teeth 117 on the ring 115 face in an upward direction, and the coengaging teeth 120 on the sleeve 49 face in a downward direction, the sleeve 49 cannot be moved downwardly along the body 10. Such downward movement will cause the coengaging cam teeth 118, 119 to urge the ring 115 outwardly and insure the retention of the ratchet teeth 117, 120 in mesh with one another. Accordingly, the setting sleeve 49, ratchet housing 36, and upper abutment 33 cannot be moved down once again along the body, the parts remaining in the position shown in FIGS. 8 and 8a, and insuring that the apparatus can be moved up or down the hole, as desired, without inadvertent or undesired setting of the well packer A against the well casing B. The well packer is removed completely from the well casing, whereupon the retrieving tool E can be disconnected therefrom.

Figure 12:
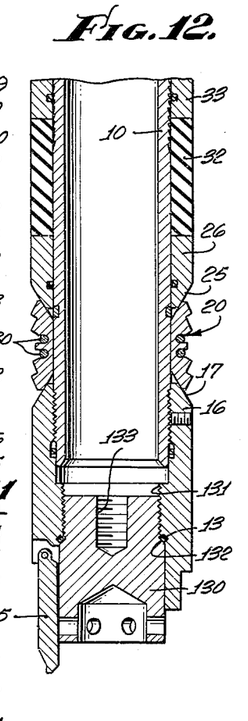
FIG. 12 is a longitudinal section through the lower portion of the well packer converted for use as a bridge plug.

In the form of well packer shown in FIG. 12, it has merely been converted to a bridging plug. A central plug 130 is threadedly secured within the threaded bore 131 of the lower body member 12, and has a tapered head 132 adapted to engage the valve seat 13 on this member to insure against leakage between the parts. This plug 130 holds the flapper valve head 15 to one side and will prevent fluid from passing in either direction through the well packer. The threaded bore 133 in the upper portion of the plug 130 is provided for use with equipment for setting the well packer on a wire line. Such equipment forms no part of the present invention.

The inventor claims:

1. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; actuating means shiftable downwardly along said body for moving said upper expander relatively downward along said body toward said lower expander to expand said slips into engagement with the well conduit; and one-way retaining means between and engaging said actuating means and body for preventing upward movement of said upper expander along said body, said retaining means including a threaded connection permitting said actuating means to move upwardly along said body in response to relative rotation between said actuating means and body to enable said slips to release from the well conduit.

2. In a well tool adapted to be set in a well conduit disposed in a well bore: a body; an upper expander on said body having an expander surface inclined inwardly and downwardly; a lower expander on said body having an expander surface inclined inwardly and upwardly; one of said expanders being secured to said body and the other of said expanders being slidable on said body; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; actuating means for moving said body and one expander relatively in a direction toward said other expander to expand said slips into engagement with the well conduit; and one-way retaining means between and engaging said actuating means and body for preventing relative movement of said body and one expander in the opposite direction; said retaining means including a threaded connection permitting relative movement of said body and one expander in said opposite direction in response to relative rotation between said actuating means and body to enable said slips to release from the well conduit.

3. In a well tool adapted to be set in a well conduit disposed in a well bore: a body; an upper expander on said body having an expander surface inclined inwardly and downwardly; a lower expander on said body having an expander surface inclined inwardly and upwardly; one of said expanders being secured to said body and the other of said expanders being slidable on said body; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; actuating means for moving said body and one expander relatively in a direction toward said other expander to expand said slips into engagement with the well conduit; an annular ratchet member between and engaging said actuating means and body; coengageable ratchet threads on said body and ratchet member for preventing relative movement of said body and one expander in a direction away from said other expander, said threads permitting such relative movement in the direction away from said other expander in response to relative rotation between said actuating means and body to enable said slips to release from the well conduit.

4. In a well tool adapted to be lowered in a well bore: a body; normally retracted means on said body; means movable relatively along said body in one direction for expanding said normally retracted means outwardly of said body; an annular ratchet member between and engaging said movable means and body; coengageable ratchet threads on said body and ratchet member, which are engaged when said normally retracted means is expanded outwardly, for preventing relative movement between said movable means and body in the opposite direction, said threads permitting such relative movement in the opposite direction in response to relative rotation between said movable means and body to enable said normally retracted means to retract from its expanded position.

5. In a well tool adapted to be set in a well conduit disposed in a well bore: a body; an upper expander on said body having an expander surface inclined inwardly and downwardly; a lower expander on said body having an expander surface inclined inwardly and upwardly; one of said expanders being secured to said body and the other of said expanders being slidable on said body; slips around said body and expanders, each slip having upper and lower expander surfaces companion to and engaging said upper and lower expander surfaces, respectively, each slip having lower conduit engaging wickers facing upwardly and upper conduit engaging wickers facing downwardly; a normally retracted packing structure on said body; actuating means for moving said body and one expander relatively in one direction toward said other expander and packing structure to expand said slips and packing structure into engagement with the well conduit; an annular ratchet member between and engaging said actuating means and body; coengageable ratchet threads on said body and ratchet member for preventing relative movement of said body and one expander in the opposite direction, said threads permitting such relative movement in the opposite direction in response to relative rotation between said actuating means and body to enable said slips and packing structure to retract from the well conduit.

6. In a well tool adapted to be set in a well conduit disposed in a well bore: a body; an upper expander on said body having an expander surface inclined inwardly and downwardly; a lower expander on said body having an expander surface inclined inwardly and upwardly; one of said expanders being secured to said body and the other of said expanders being slidable on said body; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; actuating means for moving said body and one expander relatively in a direction toward said other expander to expand said slips into engagement with the well conduit; one-way retaining means between and engaging said actuating means and body for preventing relative movement of said body and one expander in the opposite direction; said retaining means including a threaded connection permitting relative movement of said body and one expander in said opposite direction in response to relative rotation between said actuating means and body to enable said slips to release from the well conduit; and lock means engaging said body and actuating means after said slips have released from the well conduit to prevent said actuating means from re-expanding said slips.

7. In a well tool adapted to be lowered in a well bore: a body; normally retracted means on said body; means movable relatively along said body in one direction for expanding said normally retracted means outwardly of said body; an annular ratchet membe rbetween and engaging said movable means and body; coengageable ratchet threads on said body and ratchet member, which are engaged when said normally retracted means is expanded outwardly, for preventing relative movement between said movable means and body in the opposite direction, said threads permitting such relative movement in the opposite direction in response to relative rotation between said movable means and body to enable said normally retracted means to retract from its expanded position; and lock means engaging said expanding means and body after said normally retracted means has been retracted to prevent said expanding means from re-expanding said normally retracted means.

8. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; actuating means shiftable downwardly along said body for moving said upper expander relatively downward along said body toward said lower expander to expand said slips into engagement with the well conduit; one-way retaining means between and engaging said actuating means and body for preveting upward movement of said upper expander along said body, said retaining means including a threaded connection permitting said actuating means to move upwardly along said body in response to relative rotation between said actuating means and body to enable said slips to release from the well conduit; and a retrieving tool adapted to be lowered in the well conduit and be coupled to said actuating means for rotating said actuating means and to elevate the well tool in the well conduit.

9. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; actuating means shiftable downwardly along said body for moving said upper expander relatively downward along said body toward said lower expander to expand said slips into engagement with the well conduit; one-way retaining means between and engaging said actuating means and body for preventing upward movement of said upper expander along said body, said retaining means including a threaded connection permitting said actuating means to move upwardly along said body in response to relative rotation between said actuating means and body to enable said slips to release from the well conduit; and a retrieving tool adapted to be lowered in the well conduit and be coupled to said actuating means for rotating said actuating means and to elevate the well tool in the well conduit; said retrieving tool embodying means for releasing said retrieving tool from said actuating means.

10. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; and actuating means including a sleeve shiftable downwardly along said body for moving said upper expander relatively downward along said body toward said lower expander to expand said slips into engagement with the well conduit; one-way retaining means between and engaging said actuating means and body for preventing upward movement of said upper expander along said body, said retaining means including a threaded connection permitting said actuating means to move upwardly along said body in response to relative rotation between said actuating means and body to enable said slips to release from the well conduit; said sleeve having an internal thread; a retrieving tool adapted to be lowered in the well conduit to the well tool, said retrieving tool having an externally threaded member adapted to be threaded into said internal thread to couple said retrieving tool to said sleeve and enable said retrieving tool to rotate said actuating means to release said slips.

11. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; and actuating means including a sleeve shiftable downwardly along said body for moving said upper expander relatively downward along said body toward said lower expander to expand said slips into engagement with the well conduit; one-way retaining means between and engaging said actuating means and body for preventing upward movement of said upper expander along said body, said retaining means including a threaded connection permitting said actuating means to move upwardly along said body in response to relative rotation between said actuating means and body to enable said slips to release from the well conduit; said sleeve having an internal thread;

a retrieving tool adapted to be lowered in the well conduit to the well tool, said retrieving tool including a mandrel, a threaded expansible and retractable latch member adapted to be threaded into said internal thread to couple said retrieving tool to said sleeve, and a retaining member on said mandrel engageable with said latch member to hold said latch member in threaded mesh with said internal thread.

12. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; and actuating means including a sleeve shiftable downwardly along said body for moving said upper expander relatively downward along said body toward said lower expander to expand said slips into engagement with the well conduit; one-way retaining means between and engaging said actuating means and body for preventing upward movement of said upper expander along said body, said retaining means including a threaded connection permitting said actuating means to move upwardly along said body in response to relative rotation between said actuating means and body to enable said slips to release from the well conduit; said sleeve having an internal thread; a retrieving tool adapted to be lowered in the well conduit to the well tool, said retrieving tool including a mandrel, a threaded expansible and retractable latch member adapted to be threaded into said internal thread to couple said retrieving tool to said sleeve, a retaining member on said mandrel engageable with said latch member to hold said latch member in threaded mesh with said internal thread; and means releasably supporting said retaining member on said mandrel, release of said releasable means allowing said retaining member to shift to a position permitting retraction of said latch member from said internal thread.

13. In a well tool to be lowered in a well bore: a mandrel adapted to be coupled to a tubular running-in string for lowering in the well bore; an expansible and retractable latch member on said mandrel and having external threads thereon; means for transmitting rotation of said mandrel to said latch member; a retaining member on said mandrel engageable with said latch member to prevent retraction of said latch member; and means mandrel, release of said releasable means from said mandrel allowing said retaining member to shift to a position permitting retraction of said latch member.

14. In a well tool to be lowered in a well bore: a mandrel adapted to be coupled to a tubular running-in string for lowering in the well bore; an expansible and retractable latch member on said mandrel and having external threads thereon; means for transmitting rotation of said mandrel to said latch member; a retaining member on said mandrel engageable with said latch member to prevent retraction of said latch member; and means releasably supporting said retaining member on said mandrel, release of said releasable means from said mandrel allowing said retaining member to shift to a position permitting retraction of said latch member; said external threads having upper and lower tapered surfaces to permit said latch member to ratchet upwardly and downwardly along a companion internal thread in response to up and down movement of said mandrel.

15. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; a packing structure on said body above said upper expander; actuating means including a sleeve shiftable downwardly along said body for moving said packing structure and upper expander relatively downward along said body toward said lower expander to expand said slips and packing structure into engagement with the well conduit; one-way retaining means between and engaging said actuating means and body for preventing upward movement of said upper expander and packing structure along said body, said retaining means including a threaded connection permitting said actuating means to move upwardly along said body in response to relative rotation between said actuating means and body to enable said slips and packing structure to release from the well conduit; said sleeve having an internal thread; and a retrieving tool adapted to be lowered in the well conduit to the well tool, said retrieving tool having an externally threaded member adapted to be threaded into said internal thread to couple said retrieving tool to said sleeve and enable said retrieving tool to rotate said actuating means to release said slips and packing structure from the well conduit.

16. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; a packing structure on said body above said upper expander; actuating means including a sleeve shiftable downwardly along said body for moving said packing structure and upper expander relatively downward along said body toward said lower expander to expand said slips and packing structure into engagement with the well conduit; one-way retaining means between and engaging said actuating means and body for preventing upward movement of said upper expander and packing structure along said body, said retaining means including a threaded connection permitting said actuating means to move upwardly along said body in response to relative rotation between said actuating means and body to enable said slips and packing structure to release from the well conduit; said sleeve having an internal thread; and a retrieving tool adapted to be lowered in the well conduit to the well tool, said retrieving tool including a mandrel, a threaded expansible and retractable latch member adapted to be threaded into said internal thread to couple said retrieving tool to said sleeve, and a retaining member on said mandrel, engageable with said latch member to hold said latch member in threaded mesh with said internal thread.

17. In a well tool adapted to be set in a well conduit disposed in a well bore: a body; an upper expander slidable on said body and having an upper expander surface inclined inwardly and downwardly; a lower expander fixed to said body and having an expander surface inclined inwardly and upwardly; slips around said body and expanders, each slip having upper and lower expander surfaces companion to and engaging said upper and lower surfaces, respectively, of said expanders, each slip having lower conduit engaging wickers facing upwardly and upper conduit engaging wickers facing downwardly; a packing structure on said body above said upper expander; actuating means including a sleeve shiftable downwardly along said body for moving said packing structure and upper expander relatively downward along said body toward said lower expander to expand said slips and packing structure into engagement with the well conduit; one-way retaining means between and engaging said actuating means and body for preventing upward movement of said upper expander and packing structure along said body, said retaining means including a threaded connection permitting said actuating means to move upwardly along said body in response to relative rotation between said actuating means and body to enable said slips and packing structure to release from the well conduit; said sleeve having an internal thread; a retrieving tool adapted to be lowered in the well conduit to the well tool, said retrieving tool including a mandrel, a threaded expansible and retractable latch member adapted to be threaded into said internal thread to couple said retrieving tool to said sleeve, a retaining member on said mandrel engageable with said latch member to hold said latch member in threaded mesh with said internal thread, and means releasably supporting said retaining member on said mandrel, release of said releasable means allowing said retaining member to shift to a position permitting retraction of said latch member from said internal thread.

References Cited in the file of this patent

UNITED STATES PATENTS

| | | |
|---|---|---|
| 1,303,091 | Mack | May 6, 1919 |
| 2,221,204 | Santiago | Nov. 12, 1940 |
| 2,585,706 | Ware | Feb. 12, 1952 |
| 2,672,199 | McKenna | Mar. 16, 1954 |
| 2,703,623 | Baker | Mar. 8, 1955 |
| 2,714,931 | Bouvier | Aug. 9, 1955 |
| 2,751,019 | Baker | June 19, 1956 |